United States Patent
Malaya (10) Patent No.: US 11,741,397 B2
(45) Date of Patent: Aug. 29, 2023

(54) ARTIFICIAL NEURAL NETWORK EMULATION OF HOTSPOTS

(71) Applicant: Advanced Micro Devices, Inc., Santa Clara, CA (US)

(72) Inventor: Nicholas Malaya, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 947 days.

(21) Appl. No.: 16/694,926

(22) Filed: Nov. 25, 2019

(65) Prior Publication Data

US 2021/0158222 A1 May 27, 2021

(51) Int. Cl.
*G06N 20/10* (2019.01)
*G06N 3/08* (2023.01)
*G06N 3/04* (2023.01)

(52) U.S. Cl.
CPC .............. *G06N 20/10* (2019.01); *G06N 3/04* (2013.01); *G06N 3/08* (2013.01)

(58) Field of Classification Search
CPC ........ G06N 20/00; G06N 20/10; G06N 20/20; G06N 3/04; G06N 3/044; G06N 3/045; G06N 3/0464; G06N 3/08; G06N 3/082
See application file for complete search history.

(56) References Cited

U.S. PATENT DOCUMENTS

| | | | | |
|---|---|---|---|---|
| 2016/0358070 | A1* | 12/2016 | Brothers | G06N 3/082 |
| 2018/0260699 | A1* | 9/2018 | Natroshvili | G06N 20/10 |
| 2021/0358183 | A1* | 11/2021 | Yu | G16H 30/20 |

OTHER PUBLICATIONS

Ling, J., et al., "Reynolds Averaged Turbulence Modeling Using Deep Neural Networks with Embedded Invariance", 17 pgs., Jul. 25, 2016 (downloaded from https://www.osti.gov/servlets/purl/1333570).
Mustafa, M., et. al., "CosmoGAN: Creating High-Fidelity Weak Lensing Convergence Maps Using Generative Adversarial Networks", arXiv: 1706.02390, 13 pgs., May 2019.
Goodfellow, I., et. al., "Deep Learning", MIT Press, 2016.

* cited by examiner

*Primary Examiner* — Shane D Woolwine
(74) *Attorney, Agent, or Firm* — Volpe Koenig (57) ABSTRACT

Methods, devices, and systems for emulating a compute kernel with an ANN. The compute kernel is executed on a processor, and it is determined whether the compute kernel is a hotspot kernel. If the compute kernel is a hotspot kernel, the compute kernel is emulated with an ANN, and the ANN is substituted for the compute kernel.

20 Claims, 9 Drawing Sheets

ARTIFICIAL NEURAL NETWORK EMULATION OF HOTSPOTS

BACKGROUND

Many computer programs are computationally intensive, or include computationally intensive portions. Such portions take longer to complete execution, consume more memory and/or bandwidth resources, sections, and/or exhibit poor computing performance in other ways, as compared with other code portions, or as compared with a threshold. Portions of computer programs that are relatively more computationally intensive than others, or exhibit computational intensity above a threshold, are referred to as "hotspots".

An artificial neural network (ANN) is a computing device or system inspired by the way biological nervous systems, such as brains, process information. The ANN can be trained by inputting a training data set, having a known correct output, to generate an output inference. An ANN can be trained to generate output inferences with a quantifiable accuracy and inference speed based on arbitrary inputs.

BRIEF DESCRIPTION OF THE DRAWINGS

A more detailed understanding can be had from the following description, given by way of example in conjunction with the accompanying drawings wherein.

DETAILED DESCRIPTION

Some implementations include a method for emulating a compute kernel with an ANN. The method includes executing the compute kernel on a processor and determining whether the compute kernel is a hotspot kernel. If the compute kernel is a hotspot kernel, the compute kernel is emulated with an ANN, and the ANN is substituted for the compute kernel.

Some implementations include a computing device which emulates a compute kernel with an ANN. The computing device includes a processor to execute the compute kernel and to determine whether the compute kernel is a hotspot kernel. The processor also emulates the compute kernel with an ANN and substitutes the ANN for the compute kernel if the compute kernel is a hotspot kernel.

Figure 1:
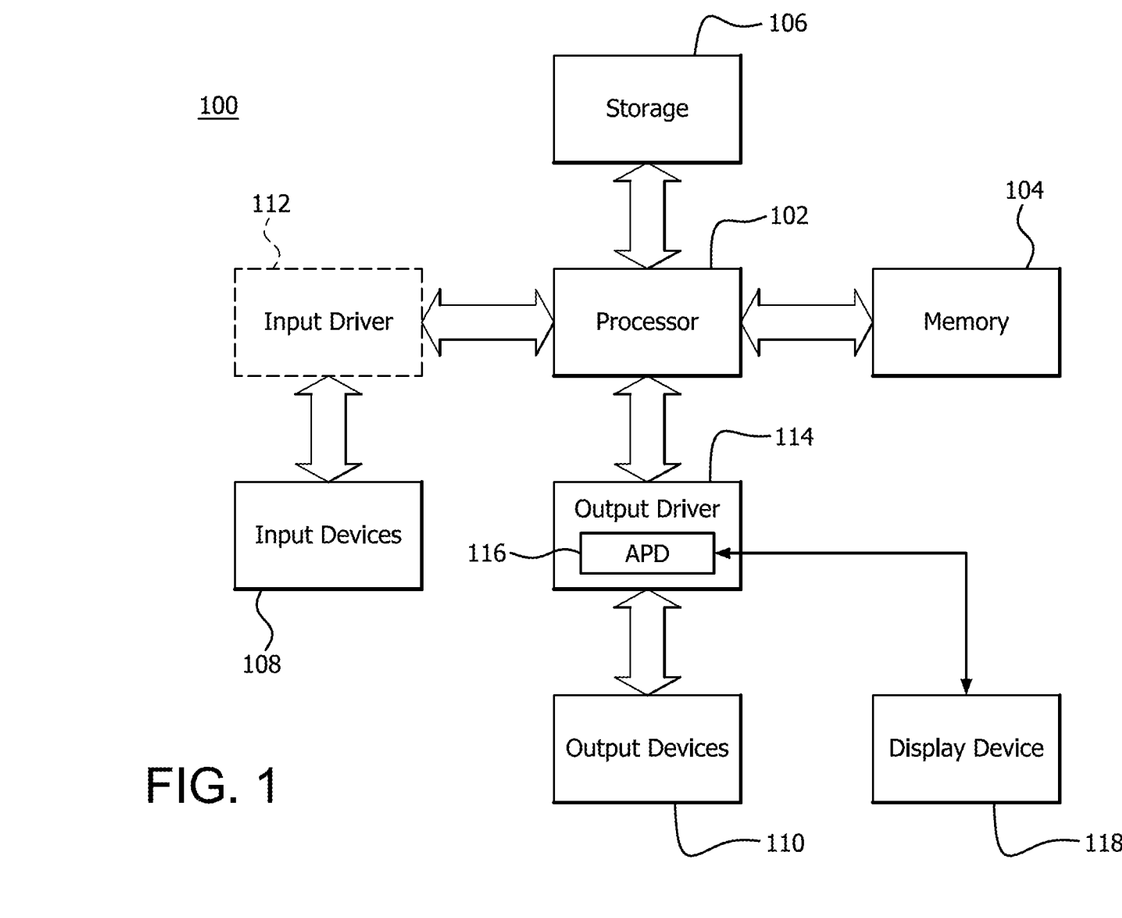
FIG. 1 is a block diagram of an example device in which one or more features of the disclosure can be implemented.

FIG. 1 is a block diagram of an example device 100 in which one or more features of the disclosure can be implemented. The device 100 can include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 can also optionally include an input driver 112 and an output driver 114. It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is be located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. The output driver 116 includes an accelerated processing device ("APD") 116 which is coupled to a display device 118. The APD is configured to accept compute commands and graphics rendering commands from processor 102, to process those compute and graphics rendering commands, and to provide pixel output to display device 118 for display. As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and configured to provide graphical output to a display device 118. For example, it is contemplated that any processing system that performs processing tasks in accordance with a SIMD paradigm can be configured to perform the functionality described herein. Alternatively, it is contemplated that computing systems that do not perform processing tasks in accordance with a SIMD paradigm performs the functionality described herein.

Figure 2:
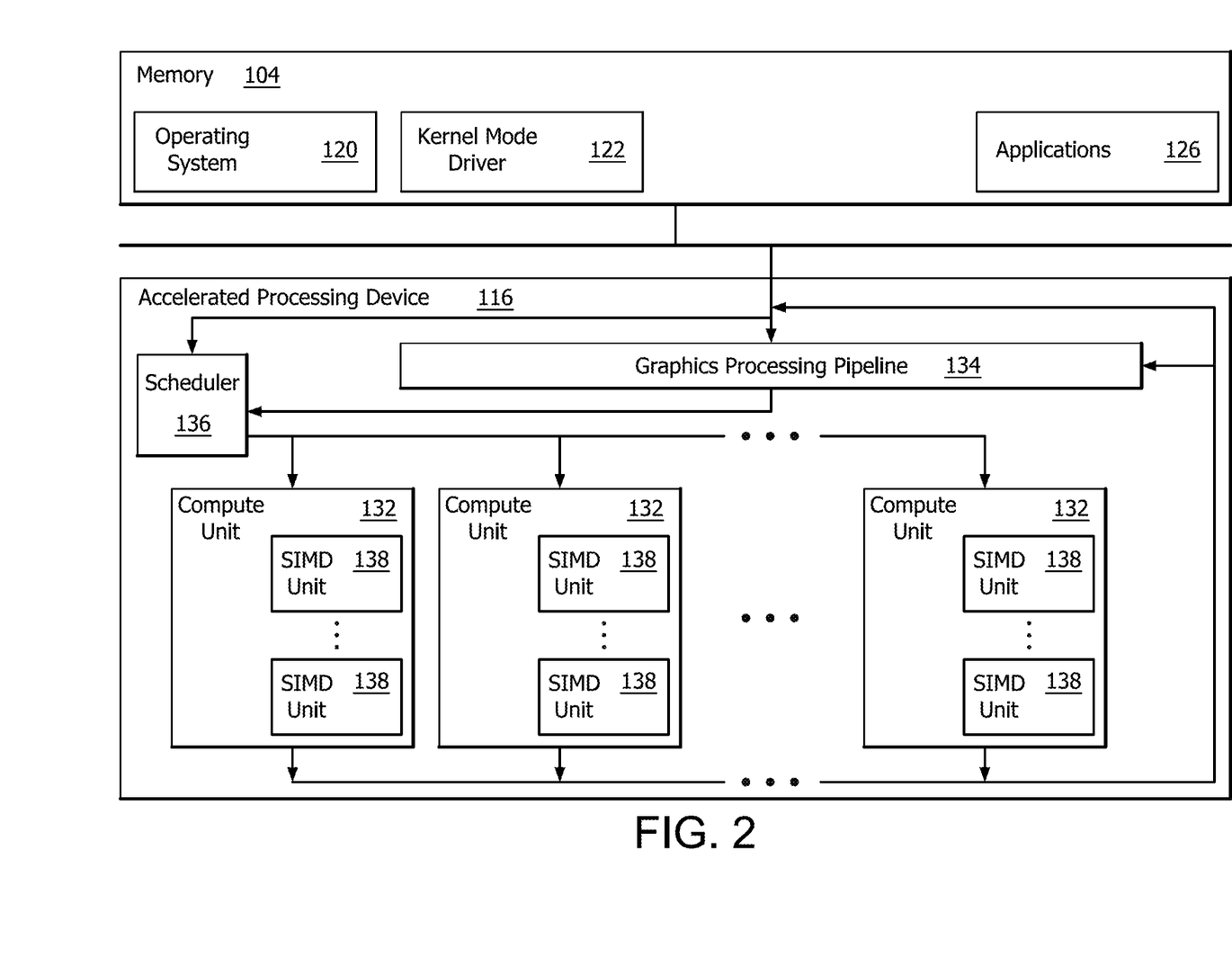
FIG. 2 is a block diagram of the device of FIG. 1, illustrating additional detail.

FIG. 2 is a block diagram of the device 100, illustrating additional details related to execution of processing tasks on the APD 116. The processor 102 maintains, in system memory 104, one or more control logic modules for execution by the processor 102. The control logic modules include an operating system 120, a kernel mode driver 122, and applications 126. These control logic modules control various features of the operation of the processor 102 and the APD 116. For example, the operating system 120 directly communicates with hardware and provides an interface to the hardware for other software executing on the processor 102. The kernel mode driver 122 controls operation of the APD 116 by, for example, providing an application programming interface ("API") to software (e.g., applications 126) executing on the processor 102 to access various functionality of the APD 116. The kernel mode driver 122 also includes a just-in-time compiler that compiles programs for execution by processing components (such as the SIMD units 138 discussed in further detail below) of the APD 116.

The APD 116 executes commands and programs for selected functions, such as graphics operations and non-graphics operations that are suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that are configured to perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items can be executed simultaneously as a "wavefront" on a single SIMD processing unit 138. One or more wavefronts are included in a "work group," which includes a collection of work-items designated to execute the same program. A work group can be executed by executing each of the wavefronts that make up the work group. In alternatives, the wavefronts are executed sequentially on a single SIMD unit 138 or partially or fully in parallel on different SIMD units 138. Wavefronts can be thought of as the largest collection of work-items that can be executed simultaneously on a single SIMD unit 138. Thus, if commands received from the processor 102 indicate that a particular program is to be parallelized to such a degree that the program cannot execute on a single SIMD unit 138 simultaneously, then that program is broken up into wavefronts which are parallelized on two or more SIMD units 138 or serialized on the same SIMD unit 138 (or both parallelized and serialized as needed). A scheduler 136 is configured to perform operations related to scheduling various wavefronts on different compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

Portions of computer programs that are relatively more computationally intensive than others, or exhibit computational intensity above a threshold, are referred to as "hotspots" as discussed above. In some computing paradigms, such as high performance computing (HPC), computer programs are divided into separate compute kernels for execution. A compute kernel that is relatively more computationally intensive than others, or exhibits computational intensity above a threshold is also referred to as a hotspot, or is referred to as a hotspot kernel. In some implementations, different compute kernels are executed on the same processing device (e.g., a CPU), or different processing devices (e.g., on separate CPU cores, on a CPU and GPU, etc.). Various examples are described herein with respect to compute kernels, and hotspot kernels for ease of description. It is noted that the principles also apply to other kinds of executable code, including other kinds of hotspots.

In some cases (e.g., where a hotspot delays execution by more than a threshold amount) hotspots are revised to improve performance. For example, in some cases, a hotspot kernel is made more efficient by offloading it from a scalar device, such as a CPU, to a parallel device, such as a GPU. Porting scalar code to run on the parallel device, in practice, often requires the services of an expert programmer, such as a specialist in the GPU or HPC domain. Collaboration with a domain expert to port a kernel in this way is often referred to as "co-design."

Figure 3:
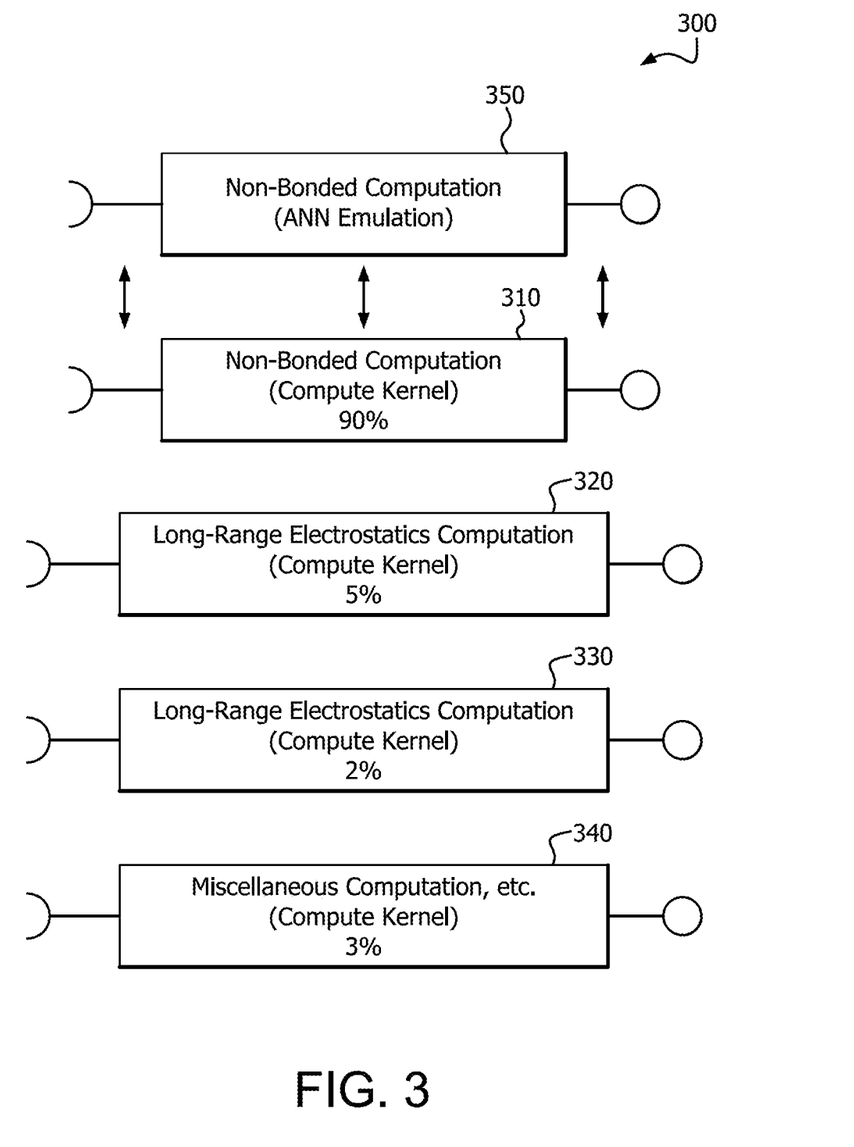
FIG. 3 is s a block diagram illustrating kernels of an example program executable on a computing device, such as the device of FIGS. 1 and 2.

FIG. 3 is a block diagram illustrating kernels 300 of an example program executable on a computing device, such as device 100 as shown and described with respect to FIGS. 1 and 2. Kernels 300 are part of a molecular dynamics simulation program, for the sake of example, however the concepts described herein are applicable to any application.

Kernels 300 include a non-bonded interactions computation compute kernel 310, long-range electrostatics computation compute kernel 320, bonded force computation compute kernel 330, and miscellaneous computations compute kernel 340. In some implementations, bonded force computations include computations to simulate interactions between atoms that are linked by a covalent bond. In some implementations, non-bonded interactions computations include computations to simulate interactions between atoms that are not linked by a covalent bond. In some implementations, long-range electrostatics computations include computations to simulate attractive or repulsive interactions due to electric charges between atoms at longer ranges, e.g., atoms that are not linked by a covalent bond.

In some implementations, miscellaneous computations include any other computations suitable for the molecular dynamics simulation. Each of the compute kernels 310, 320, 330, and 340 includes one or more data inputs and data outputs, which feeds or is fed by other compute kernels.

In this example, when executed on a processor (e.g., processor 102 of device 100 as shown and described with respect to FIGS. 1 and 2), non-bonded interactions computation compute kernel 310 consumes 90% of available computing resources, long-range electrostatics computation compute kernel 320 consumes 5% of available computing resources, bonded force computation compute kernel 330 consumes 2% of available computing resources, and miscellaneous computations compute kernel 340 consumes 2% of available computing resources. In this example, available computing resources refers to the percentage utilization of the processor (e.g., processor 102). In other examples, computing resources refers to, or is related to, memory utilization, runtime, cache miss rates, power consumption, and/or any other suitable metric, or a combination of metrics of computer performance. It is noted that while the percentage of available computing resources used by kernels 300 add up to 100%, this is not necessarily the case in all implementations (e.g., in cases where one or more kernels are run on different processors). In some such cases, hotspot kernels are identified based on utilization of computing resources available to the kernel, and not based on utilization relative to other kernels.

In this example, non-bonded interactions computation compute kernel 310 is identified as a hotspot kernel because it is consuming 90% of the available computing resources, whereas the other kernels consume substantially fewer computing resources. In some examples, a threshold value (e.g., of consumed available computing resources) is used to determine whether a compute kernel or code section is a hotspot. In some cases, co-design results in performance improvements due to the efficient use of alternative hardware to execute the code hotspot. For example, in some implementations, non-bonded interactions computation compute kernel 310 is ported to execute on a GPU or other device. In some implementations, this has the advantage of increasing the speed of execution of compute kernel 310 due to the specifics of the GPU hardware. Co-design of the code hotspot by a domain specialist is time consuming and costly in some cases.

Accordingly, in some implementations, it can be desired to emulate a hotspot or hotspot kernel using an ANN to provide higher performance than the original code or kernel. In some cases, this has the advantage of providing the same or substantially similar performance without the costs and/or delays of employing a specialist programmer to port the code.

In the example of FIG. 3, ANN 350 is trained to emulate non-bonded interactions computation compute kernel 310, and this kernel, its inputs, and its outputs, are functionally replaced by ANN 350 in the executable code.

Figure 4:
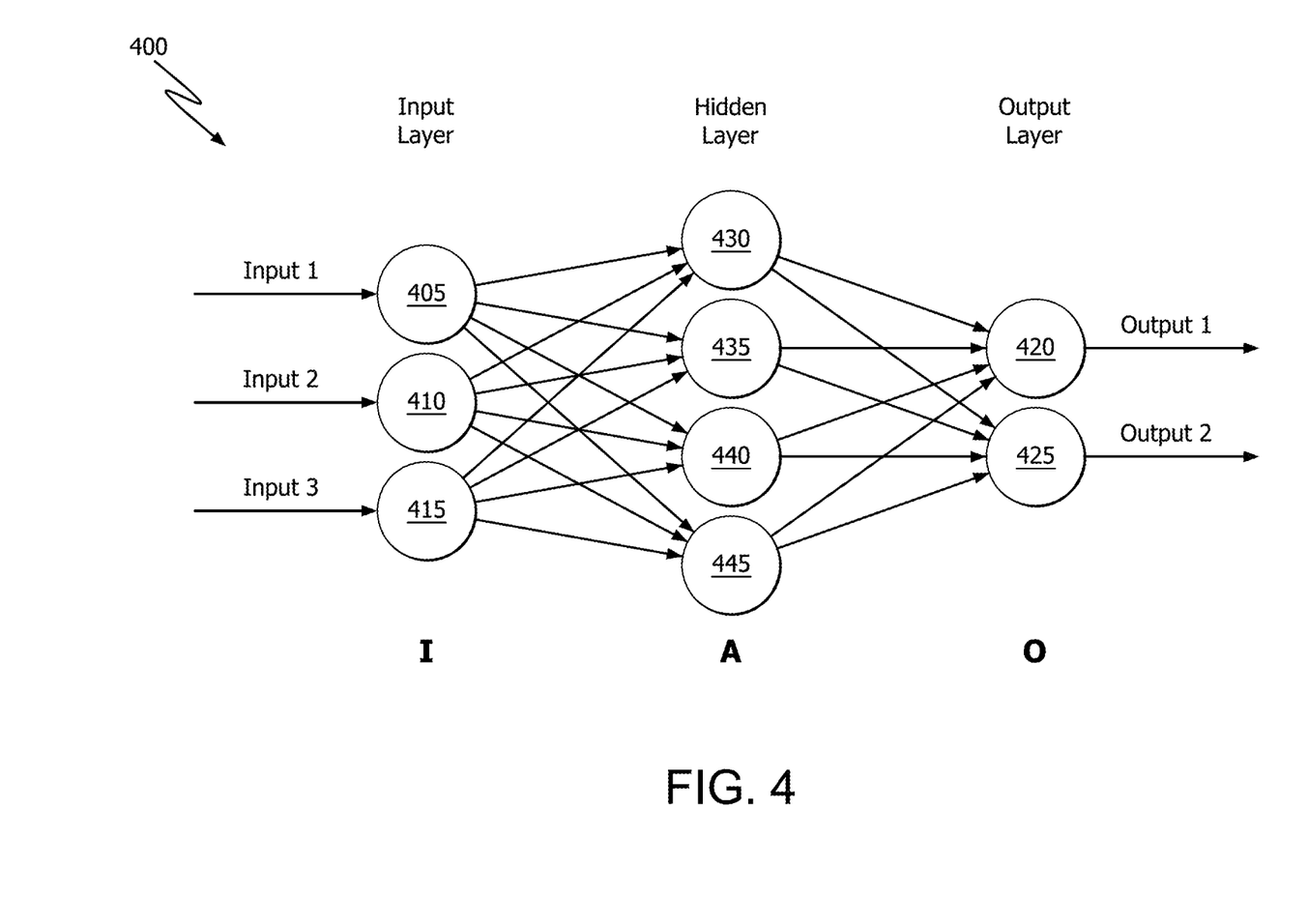
FIG. 4 is a schematic diagram illustrating aspects of an example ANN.

FIG. 4 is a schematic diagram illustrating aspects of an example ANN 400. ANN 400 includes a plurality of nodes such as input nodes 405, 410, 415; output nodes 420, 425; and hidden nodes 430, 435, 440, 445. ANN 400 is described generally as an ANN, however this description also broadly illustrates a convolutional neural network (CNN). ANN 400 is one example of an ANN that is trainable to emulate a hotspot. In other implementations, other topologies or kinds of ANN are used, such as a recurrent neural network (RNN). In some implementations, any suitable ANN is used to emulate the hotspot. In some implementations, ANN 350, shown and describe with respect to FIG. 3 is implemented using ANN 400, a substantially similar ANN, or a different ANN.

Example ANN 400 is organized into layers, including an input layer I, an output layer O, and a hidden layer A (i.e., not input or output). Input layer I includes input nodes 405, 410, 415. Output layer O includes output nodes 420, 425. Hidden layer A includes hidden nodes 430, 435, 440, 445. In this context, describing a node or layer as hidden means that it is both input to and output from only by other nodes of the ANN, unlike input nodes and output nodes, which have a regular input or output interface with components outside of the ANN. A layer which outputs to or inputs from another layer can be described as logically adjacent to that layer. For example, in ANN 400, hidden layer A can be described as logically adjacent to input layer I and to output layer O. Logical adjacency in this context neither requires nor excludes physical adjacency.

The input, output, and hidden layers are interconnected by various links as shown in FIG. 4. In the example of ANN 400 each node shares a link with each node in its logically adjacent layers (i.e., is fully connected). The topology of ANN 400 is only one example, and it is noted that an ANN can be arranged in any suitable topology. For example, an ANN can instead include a different number of hidden layers, different numbers of input and/or output nodes, and/or different numbers and/or arrangements of links. ANN 400 is shown as having only one hidden layer, however the techniques described herein can also be applied to deep neural networks (i.e., having more than one hidden layer), or networks having no hidden layers. It is noted that in other ANNs, each node need not share a link with each node in its logically adjacent layers (i.e., cannot be fully connected).

Each of the hidden nodes of ANN 400 receives data from one or more preceding (i.e., closer to the input layer) nodes in a logically adjacent layer via a link, and outputs data to one or more succeeding (i.e., closer to the output layer) nodes in a logically adjacent layer via a link. For example, hidden node 430 inputs data from each of input nodes 405, 410, 415 via corresponding links, and outputs data to each of output nodes 420, 425 via corresponding links.

Each node processes its input data according to a function, which can be referred to as an activation function of the node. Each of the links is associated with a weight by which the data passing over that link is weighted (e.g., multiplied) before it is input to the activation function. For example, the data input to hidden node 430 is weighted according to the link weight of each corresponding input link from input nodes 405, 410, 415. Thus, if the link weight of the link from input node 405 is other than 1, the data will be modified based on the link weight before it is processed by the activation function of hidden node 430. If the link weight of the link from input node 410 differs from the link weight of the link from input node 405, the data from each of the input nodes will be weighted differently before it is processed by the activation function of hidden node 420. Similarly, the data output from hidden node 430 to each of output nodes 420, 425 of output layer O is weighted according to each corresponding output link. In some implementations (e.g., image processing) the link weight of each input link to a node is expressed as a vector or matrix of weights. For example, in some implementations the input weights for a node that inputs a square grid of 9 pixels is expressed as a 3×3 matrix. In some implementations, the vector or matrix of weights is referred to as a filter (e.g., a 3×3 filter, 5×5 filter, 7×7 filter, etc.). In some examples, filters are implemented as an instance of a kernel executing on a processor (e.g., a GPU). For example, if hidden nodes 430 and 435 each include a 5×5 filter, each of the filters is an instance of the same 5×5 filter kernel. Similarly, if hidden nodes 440 and 445 each include a 7×7 filter, each of the filters is an instance of the same 7×7 filter kernel.

Hidden node 430 processes the data input from input nodes 405, 410, 415, as weighted by the corresponding link weights or filters, according to its activation function to generate output data. This output data from hidden node 430 is in turn input by output nodes 420, 425 of output layer O, as weighted by the link weights or filters associated with the corresponding links. Based on the activation functions of each of the nodes and the link weights or filters of each of the links in ANN 400, an output is generated at output nodes 420, 425 based on data input to input nodes 405, 410, 415.

The nodes of ANN 400 can be implemented on any suitable processing device or devices, such as APD 116 as shown and described with respect to FIGS. 1 and 2. For example, all layers of ANN 400 can be implemented on a single compute unit 132 of APD 116. Alternatively, each layer can be implemented on a different compute unit 132 of APD 116, or subsets of layers of ANN 400 can be implemented on different compute units 132 of APD 116. Compute units 132 are shown as incorporating various SIMD units 138, however it is noted that other kinds of compute units, e.g., which do not incorporate SIMD units, can be used in other implementations.

ANN 400 is trainable in any suitable way. In some examples, ANN 400 is trained to generate a suitably accurate inference by inputting a training data set to the input layer I, and comparing the resulting output at the output layer O with a known correct output for the training data set. The difference between the output generated by ANN 400 and the known correct output is quantified or otherwise characterized (e.g., using a cost function), and the difference is known as the training loss. This training loss is used to adjust the ANN. In some implementations, such adjustments include altering link weights of one or more of the links; e.g., based on the training loss. In other examples, different kinds of adjustments are performed, such as altering activation functions of one or more of the nodes; e.g., based on the training loss. The training process iterates until the difference, (i.e., the training loss) is acceptably reduced (e.g., below a threshold). Each iteration of such training can be referred to as an epoch. This particular type of training can be referred to as backpropagation training. Backpropagation training is only one example way in which ANN 400 can be trained; any suitable training techniques can be used to train ANN 400.

The threshold below which the accuracy of inference would be unacceptable is a key performance indicator (KPI) which can be used to train the ANN. In some implementations however, the ANN is trained based on additional KPIs, such as speed, and power consumption. For example, in some applications, it is be desired to train an ANN to meet both accuracy and speed KPIs. In such applications, a model of the ANN that meets the accuracy KPI (i.e., generates inferences accurately enough) but not the speed KPI (i.e., does not generate inferences fast enough) is be retrained to increase inference speed even if this reduces accuracy, if the accuracy of the retrained ANN still meets the accuracy KPI.

In some cases, training time of the ANN is also a factor, and the training is considered to have failed if the KPIs are not met after a threshold number of epochs, or after a threshold time.

In some implementations, ANN 400 is trained to emulate a kernel, such as non-bonded interactions computation compute kernel 310, using offline training, or online training. In the case of offline training, the ANN 400 is trained before kernels 300 (as shown and described with respect to FIG. 3) are run. In the case of online training, ANN 400 is trained dynamically during the run time of kernels 300; e.g., based on actual inputs to and outputs from the kernel to be emulated.

Figure 5:
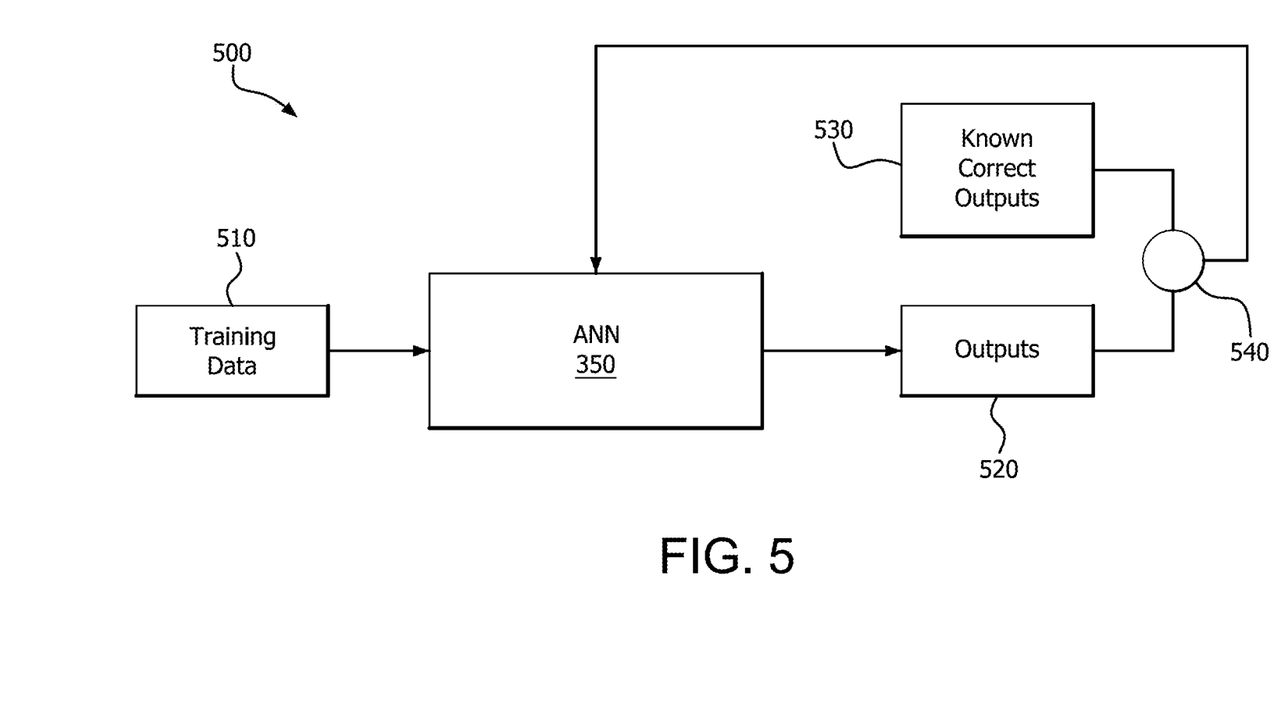
FIG. 5 is a block diagram illustrating example offline training of an example ANN.

FIG. 5 is a block diagram illustrating example offline training 500 of ANN 350. In this example, initial weights, parameters, features and/or activation functions for ANN 350 are generated (in any suitable manner) and input to a computing device (e.g., device 100 as shown and described with respect to FIGS. 1 and 2, or any other suitable computing device).

Training data 510 is input to the ANN 350. The training data can include any suitable data, such as measured quantities, artificial data generated by algorithms or simulations, expert elicitation, etc. In this example, ANN 350 is being trained to emulate non-bonded interaction computations compute kernel 310, (as shown and described with respect to FIG. 3). Accordingly, the training data includes data that is typical of inputs to non-bonded interaction computations compute kernel 310. ANN 350 generates output 520 (an inference) based on the input training data 510.

Output 520 is compared with known correct outputs 530, which are known to be correct based on the function to be modelled by ANN 350. In this example, the training data includes data that would be output from non-bonded interaction computations compute kernel 310 in response to the training data 510. Output 520 is compared with known correct outputs 530 using a comparison function 540, such as a cost function, to determine a training loss. If output 520 sufficiently corresponds to known correct outputs 530 (e.g., a value of the training loss is within a threshold), ANN 350 is considered to be trained. Otherwise, the difference between output 520 and known correct outputs 520 (or the training loss, etc.) is used to adjust ANN 350. ANN 350 can be adjusted by altering link weights, activation functions, etc. After ANN 350 is adjusted, the training iterates until the difference (i.e., the training loss) is acceptably reduced (e.g., below a threshold). In some implementations, the number of training epochs is limited, and if training has not succeeded by that number of epochs, or by a threshold time, training will be considered to have failed. In some cases, this indicates that an emulation of the function (in this example, non-bonded interaction computations compute kernel 310) with the desired performance characteristics (e.g., as indicated by the relevant KPIs) is not possible, or is unavailable within a desired training timeframe.

Figure 6:
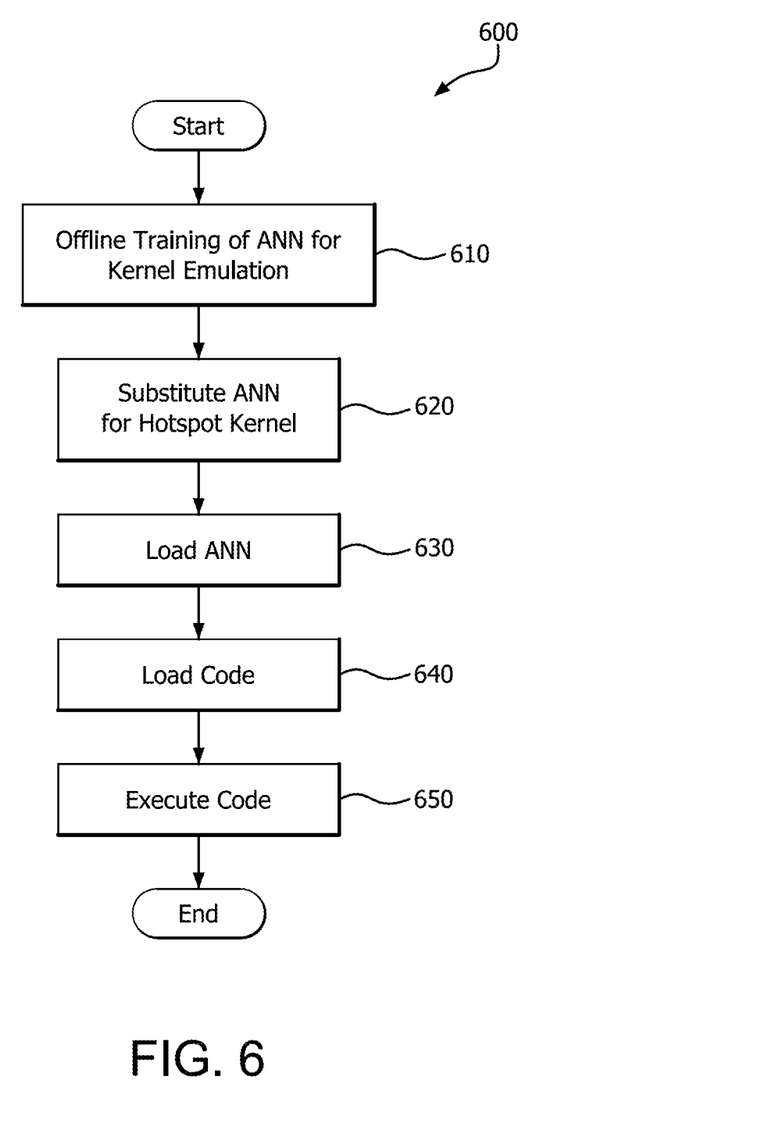
FIG. 6 is a flow chart illustrating an example procedure for emulating a kernel hotspot using an offline-trained ANN.

FIG. 6 is a flow chart illustrating an example procedure for emulating a kernel hotspot using an offline-trained ANN.

In step 610, an ANN is trained to emulate a computational kernel, such as a hotspot. The ANN is trained in any suitable way, such as according to the description of offline training 500 (as shown and described with respect to FIG. 5). In some implementations, the ANN is trained for execution on specific hardware, such as a CPU, GPU, ASIC (e.g., optimized for ANNs) or a FPGA. In this example, the ANN is trained for execution on APD 116 (as shown and described with respect to FIGS. 1 and 2). In some implementations, the ANN is trained based on an analysis of the execution of executable code for the kernel or code to be emulated, or based on an analysis of object code, assembly code, intermediate code, or any other suitable expression of the code. In some implementations, the ANN is trained in another suitable manner. The training data and known correct outputs for training include any suitable training data and known correct outputs, such as training data 510 and output 520 as shown and describe with respect to FIG. 5.

In step 620, the program which includes or calls the hotspot is modified to accommodate substitution of the ANN emulation. In this example, a main code section which coordinates inputs to and outputs from each of kernels 300 is modified to provide the inputs to non-bonded interaction computations compute kernel 310, (as shown and described with respect to FIG. 3) instead to the inputs of the ANN, and to provide the outputs of the ANN to kernels (or other executable code) which would otherwise have received the output of non-bonded interaction computations compute kernel 310.

It is noted that steps 610 and 620 are illustrated as separate steps for ease of description. In some implementations, steps 610 and 620 are performed in any suitable order, or simultaneously, or concurrently, as desired or appropriate.

In step 630, the ANN is loaded onto the device on which it is to be executed. In this example, the ANN is trained to emulate non-bonded interaction computations compute kernel 310, (as shown and described with respect to FIG. 3), and is loaded onto APD 116. In some implementations, the ANN is stored in a suitable memory, such as memory 104 (as shown and described with respect to FIGS. 1 and 2) before it is loaded.

In step 640, the code for the application is loaded onto the device on which it is to be executed. In this example, kernels 300 (as shown and described with respect to FIG. 3) and any other necessary code, such as a main code section coordinating kernels 300, are loaded onto processor 102. In some implementations, non-bonded interaction computations compute kernel 310 is not loaded. In some implementations, the code (kernels 300 in this example) is stored in a suitable memory, such as memory 104 (as shown and described with respect to FIGS. 1 and 2) before it is loaded.

It is noted that steps 630 and 640 are illustrated as separate steps for ease of description. In some implementations, steps 630 and 640 are performed in any suitable order, or simultaneously, or concurrently, as desired or appropriate. In step 650, the code is executed, functionally substituting the ANN for the emulated code section.

Figure 7:
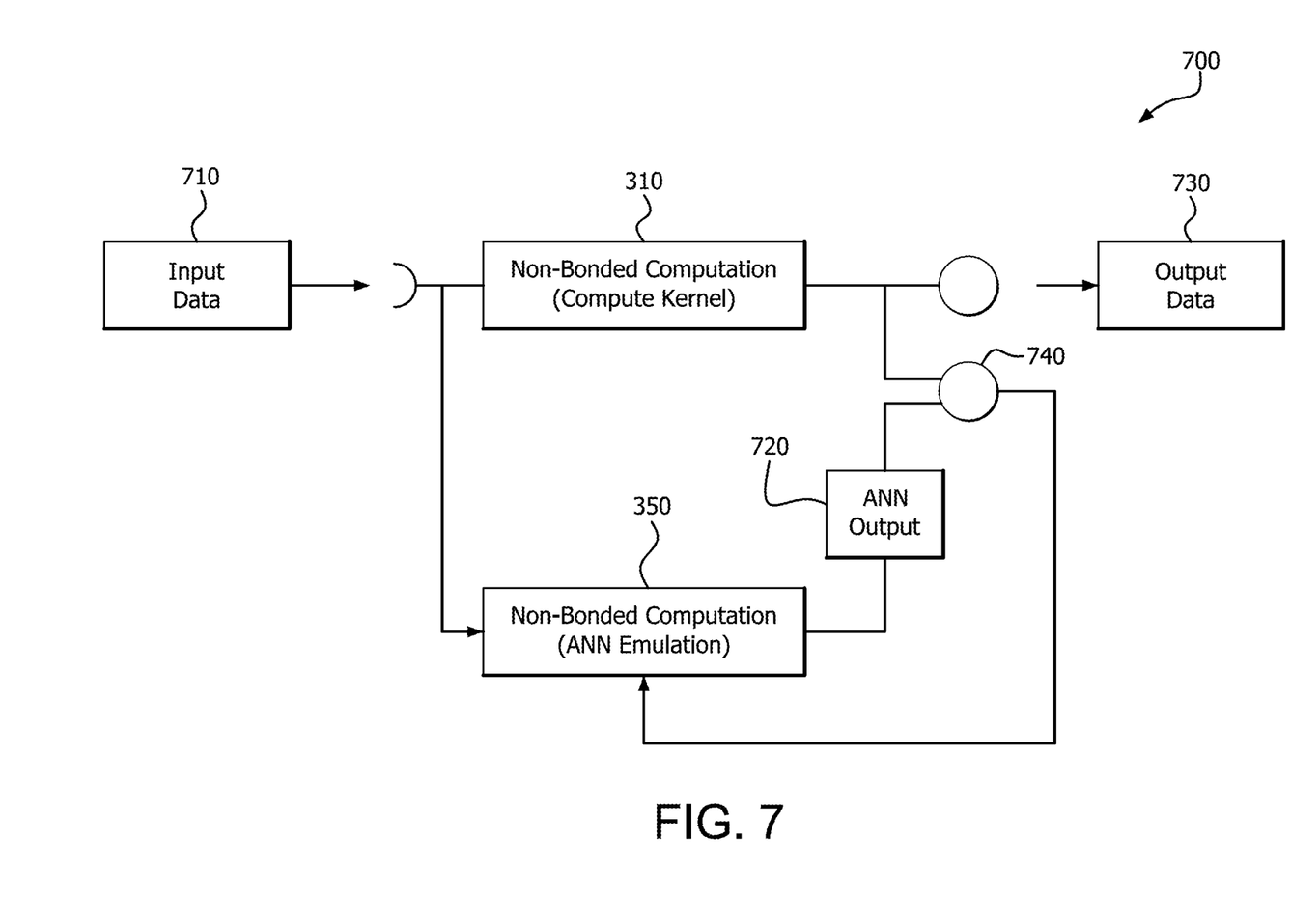
FIG. 7 is a block diagram illustrating example online training of an example ANN.

FIG. 7 is a block diagram illustrating example online training of ANN 350. In this example, initial weights, parameters, features and/or activation functions for ANN 350 are generated and input to a computing device (e.g., device 100 as shown and described with respect to FIGS. 1 and 2, or any other suitable computing device).

Input data 710 is input to the ANN 350 during the execution of the kernel (or other executable code) to be emulated by ANN 350. Input data 710 are the actual inputs to the kernel (or other executable code) to be emulated by ANN 350. In this example, input data 710 are the actual inputs to non-bonded interaction computations compute kernel 310 (as shown and described with respect to FIG. 3). ANN 350 generates ANN output 720 (an inference), using input data 710 as training data.

ANN output 720 is compared with output data 730, which correctly model the function to be modelled by ANN 350 because they are output from non-bonded interaction computations compute kernel 310 in response to input data 710, used as the training data. ANN output 720 is compared with output data 730 using a comparison function 740, such as a cost function, to determine a training loss. If ANN output 720 sufficiently corresponds to known correct output data 730 (e.g., a value of the training loss is within a threshold), ANN 350 is considered to be trained. Otherwise, the difference between ANN output 720 and output data 730 (or the training loss, etc.) is used to adjust ANN 350. ANN 350 is adjusted by altering link weights, activation functions, etc. After ANN 350 is adjusted, the training iterates until the difference (i.e., the training loss) is acceptably reduced (e.g., below a threshold). In some implementations, the number of training epochs is limited, and if training has not succeeded by that number of epochs, training will be considered to have failed.

In some implementations, input data 710 and output data 730 are used to train ANN 350 in real time with the execution of non-bonded computation compute kernel 310. In some implementations, input data 710 and output data 730 are buffered from the execution of non-bonded computation compute kernel 310 and run independently of the real-time execution of non-bonded computation kernel 310 (e.g., subsequently to, or partially concurrently with, the timing of the input and output of input data 710 and output data 730 to and from non-bonded computation compute kernel 310.)

Figure 8:
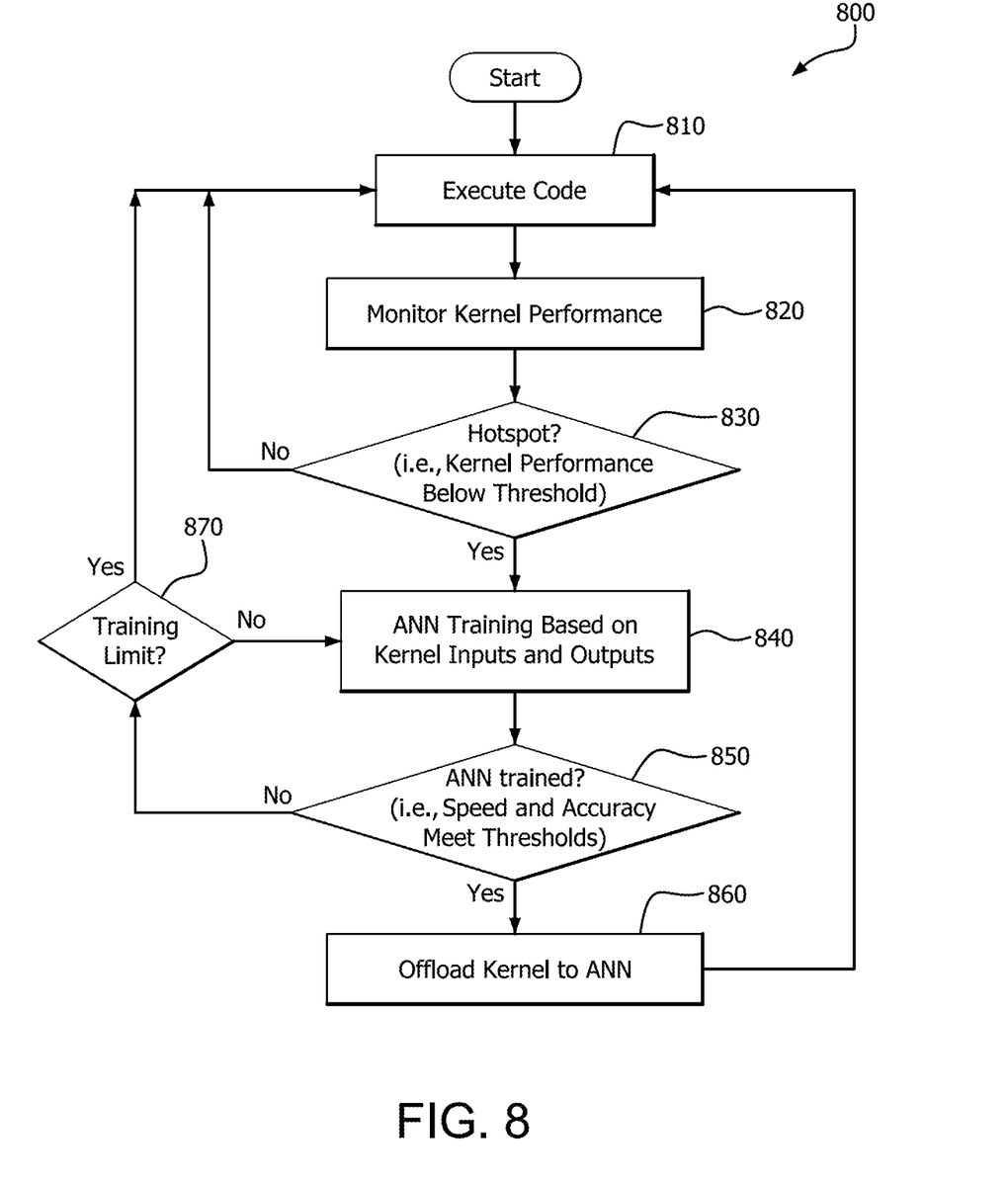
FIG. 8 is a flow chart illustrating an example procedure for emulating a kernel hotspot using an dynamically- or online-trained ANN.

FIG. 8 is a flow chart illustrating and example procedure for emulating a kernel hotspot using a dynamically- or online-trained ANN.

In step 810, executable code, including several computational kernels, is executed, and kernel performance is monitored in step 820. In some implementations, the executable code is constructed such that it supports the functional substitution of one or more ANNs for one or more of its compute kernels, or one or more code sections. In some implementations, an operating system, middleware, or other program is used to provide this functionality to the executable code.

On condition 830 that a hotspot kernel is detected, ANN training begins based on the kernel inputs and outputs. This training can be performed based on a buffered set of kernel inputs and outputs from earlier execution, based further inputs and outputs to the kernel during ongoing execution of the code, or a combination of these. It is noted that code execution continues during ANN training in this example. The ANN is trained in any suitable way. For example, in some implementations the ANN is trained in a GPU or other specialized hardware while the code continues executing on the CPU, or is trained on the same CPU while the code continues executing.

On condition 850 that the ANN has completed training, the kernel is offloaded to the ANN, and code execution continues at step 810 (including ANN emulation of the hotspot kernel). In some implementations, the ANN is considered to have completed training when it has met an accuracy threshold, a speed threshold, or both. On condition 850 that the ANN has not yet completed training, the ANN training continues at step 840 on a condition 870 that a training limit (e.g., threshold maximum number of training epochs, or threshold maximum training time) has not yet been reached. On condition 870 that a training limit has been reached, the ANN training is abandoned and the code execution continues at step 810 (without ANN emulation of the hotspot kernel).

In systems having the capacity to emulate only one hotspot using an ANN, the system ceases monitoring kernel performance and checking for hotspots after a hotspot kernel has been substituted with a trained ANN emulator. Otherwise, the system continues with steps 820 and 830 to identify further hotspots for emulation by further ANNs.

Some implementations include a hybrid approach, where one or more ANNs are pre-trained to substitute for kernel hotspots, if such hotspots are detected during execution of the kernels. In some implementations, an offline-trained ANN emulator (e.g., a more generalized ANN) is selected for substitution of a detected hotspot kernel, and the training of the ANN emulator is refined (often referred to as "transfer learning") through further online training before substitution. In some implementations, this has the advantage of reducing training time and/or computing resources required for ANN training.

Figure 9:
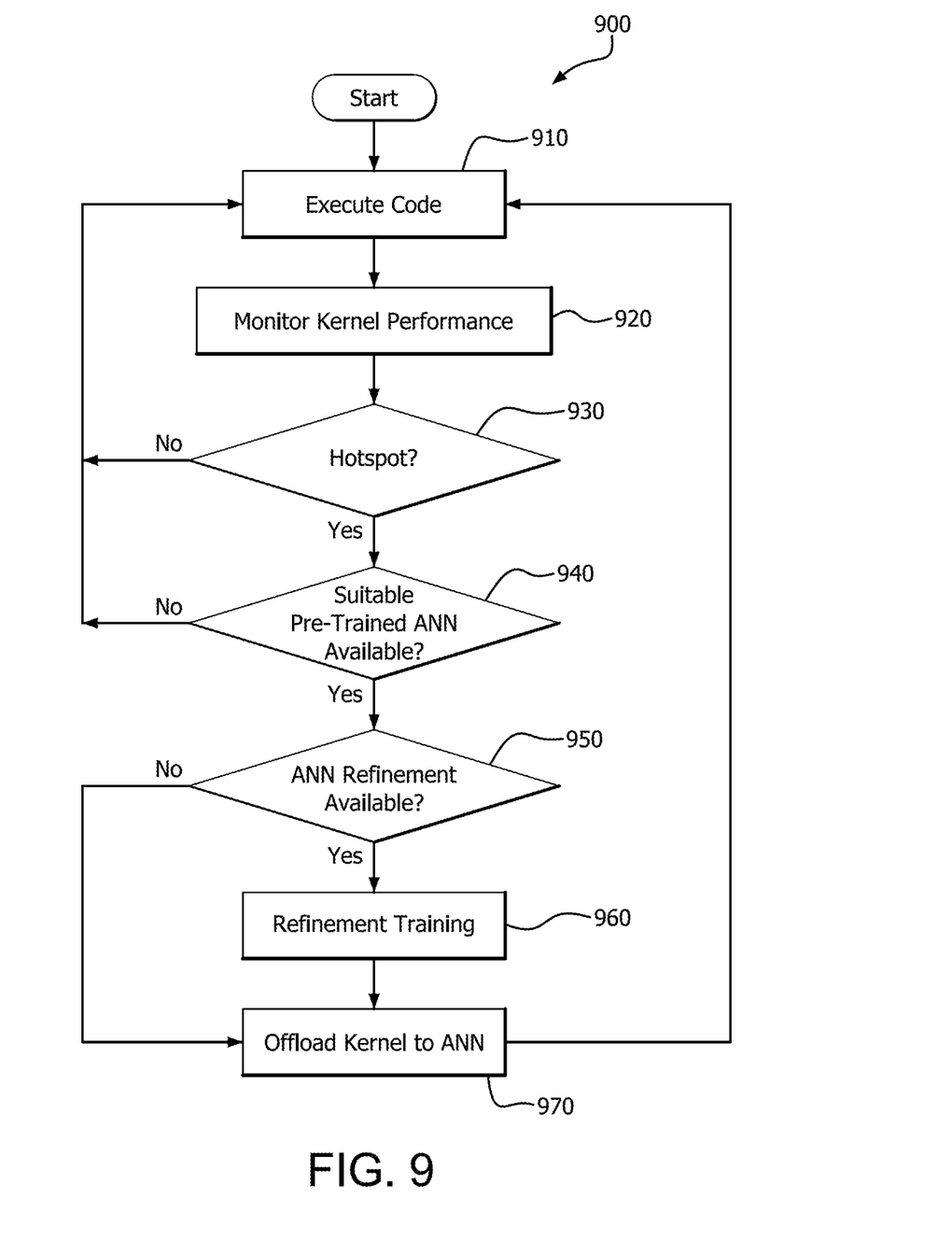
FIG. 9 is a flow chart illustrating and example procedure for emulating a kernel hotspot using an ANN that is trained using both offline and online training.

FIG. 9 is a flow chart illustrating and example procedure for emulating a kernel hotspot using an ANN, using both offline and dynamic, or online training.

In step 910, executable code, including several computational kernels, is executed, and kernel performance is monitored in step 920. In some implementations, the executable code is constructed such that it supports the functional substitution of one or more ANNs for one or more of its compute kernels, or one or more code sections. In some implementations, an operating system, middleware, or other program is used to provide this functionality to the executable code. In some implementations, one or more offline-trained ANNs are available for substitution with hotspot kernels (e.g., stored in a suitable memory).

On condition 930 that a hotspot kernel is detected, it is determined whether a suitable offline-trained ANN is available in memory (e.g., by comparing characteristics of the hotspot kernel with available offline-trained ANNs). On condition 940 that a suitable offline-trained ANN is available, the hotspot kernel is offloaded onto the ANN in step 970, or is refined using dynamic online training in step 960 before being offloaded to the ANN in step 970 on condition 950 that ANN refinement is available.

It should be understood that many variations are possible based on the disclosure herein. Although features and elements are described above in particular combinations, each feature or element can be used alone without the other features and elements or in various combinations with or without other features and elements.

The various functional units illustrated in the figures and/or described herein (including, but not limited to, the processor 102, the input driver 112, the input devices 108, the output driver 114, the output devices 110, the accelerated processing device 116, the scheduler 136, the graphics processing pipeline 134, the compute units 132, the SIMD units 138, ANN 350, or ANN 400 can be implemented as or in a general purpose computer, a processor, or a processor core, or as a program, software, or firmware, stored in a non-transitory computer readable medium or in another medium, executable by a general purpose computer, a processor, or a processor core. The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for emulating a compute kernel with an artificial neural network (ANN), the method comprising:
   executing the compute kernel on a processor;
   determining whether the compute kernel is a hotspot kernel; and
   if the compute kernel is a hotspot kernel:
   emulating the compute kernel with an ANN, and
   substituting the ANN for the compute kernel.

2. The method of claim 1, wherein determining whether the compute kernel is a hotspot kernel comprises comparing a compute resource utilization of the compute kernel with a threshold.

3. The method of claim 1, wherein determining whether the compute kernel is a hotspot kernel comprises comparing a compute resource utilization of the compute kernel with a compute resource utilization of a different compute kernel.

4. The method of claim 1, wherein emulating the compute kernel with an ANN comprises offline-training the ANN prior to executing the compute kernel.

5. The method of claim 4, wherein offline-training the ANN comprises:
   inputting, to the ANN, training data typical of inputs to the compute kernel,
   comparing outputs from the ANN to known correct outputs corresponding to the training data; and
   adjusting the ANN based on differences between the outputs from the ANN and the known correct outputs.

6. The method of claim 1, wherein emulating the compute kernel with an ANN comprises online-training the ANN based on execution of the compute kernel.

7. The method of claim 6, wherein offline-training the ANN comprises:
   inputting, to the ANN, inputs which were input to the compute kernel,
   comparing outputs from the ANN to known correct outputs corresponding to the inputs which were input to the compute kernel; and
   adjusting the ANN based on differences between the outputs from the ANN and the known correct outputs.

8. The method of claim 1, wherein emulating the compute kernel with an ANN comprises offline-training the ANN prior to executing the compute kernel, and refining the ANN using online-training based on execution of the compute kernel.

9. The method of claim 1, wherein substituting the ANN for the compute kernel comprises executing the ANN on the processor.

10. The method of claim 1, wherein substituting the ANN for the compute kernel comprises executing the ANN on a different processor in communication with the processor.

11. A computing device configured to emulate a compute kernel with an artificial neural network (ANN), the computing device comprising:
- a processor configured to execute the compute kernel and to determine whether the compute kernel is a hotspot kernel;
- the processor further configured to, if the compute kernel is a hotspot kernel:
  - emulate the compute kernel with an ANN, and
  - substitute the ANN for the compute kernel.

12. The computing device of claim 11, wherein determining whether the compute kernel is a hotspot kernel comprises comparing a compute resource utilization of the compute kernel with a threshold.

13. The computing device of claim 11, wherein determining whether the compute kernel is a hotspot kernel comprises comparing a compute resource utilization of the compute kernel with a compute resource utilization of a different compute kernel.

14. The computing device of claim 11, wherein emulating the compute kernel with an ANN comprises offline-training the ANN prior to executing the compute kernel.

15. The computing device of claim 14, wherein offline-training the ANN comprises:
- inputting, to the ANN, training data typical of inputs to the compute kernel,
- comparing outputs from the ANN to known correct outputs corresponding to the training data; and
- adjusting the ANN based on differences between the outputs from the ANN and the known correct outputs.

16. The computing device of claim 11, wherein emulating the compute kernel with an ANN comprises online-training the ANN based on execution of the compute kernel.

17. The computing device of claim 16, wherein the processor is further configured to offline-train the ANN, the processor further configured to
- input, to the ANN, inputs which were input to the compute kernel,
- compare outputs from the ANN to known correct outputs corresponding to the inputs which were input to the compute kernel; and
- adjust the ANN based on differences between the outputs from the ANN and the known correct outputs.

18. The computing device of claim 11, wherein emulating the compute kernel with an ANN comprises offline-training the ANN prior to executing the compute kernel, and refining the ANN using online-training based on execution of the compute kernel.

19. The computing device of claim 11, wherein substituting the ANN for the compute kernel comprises executing the ANN on the processor.

20. The computing device of claim 11, wherein substituting the ANN for the compute kernel comprises executing the ANN on a different processor in communication with the processor.

* * * * *